Oct. 1, 1968  H. J. HOLCOMBE  3,403,568
TRANSMISSION
Filed Aug. 16, 1965
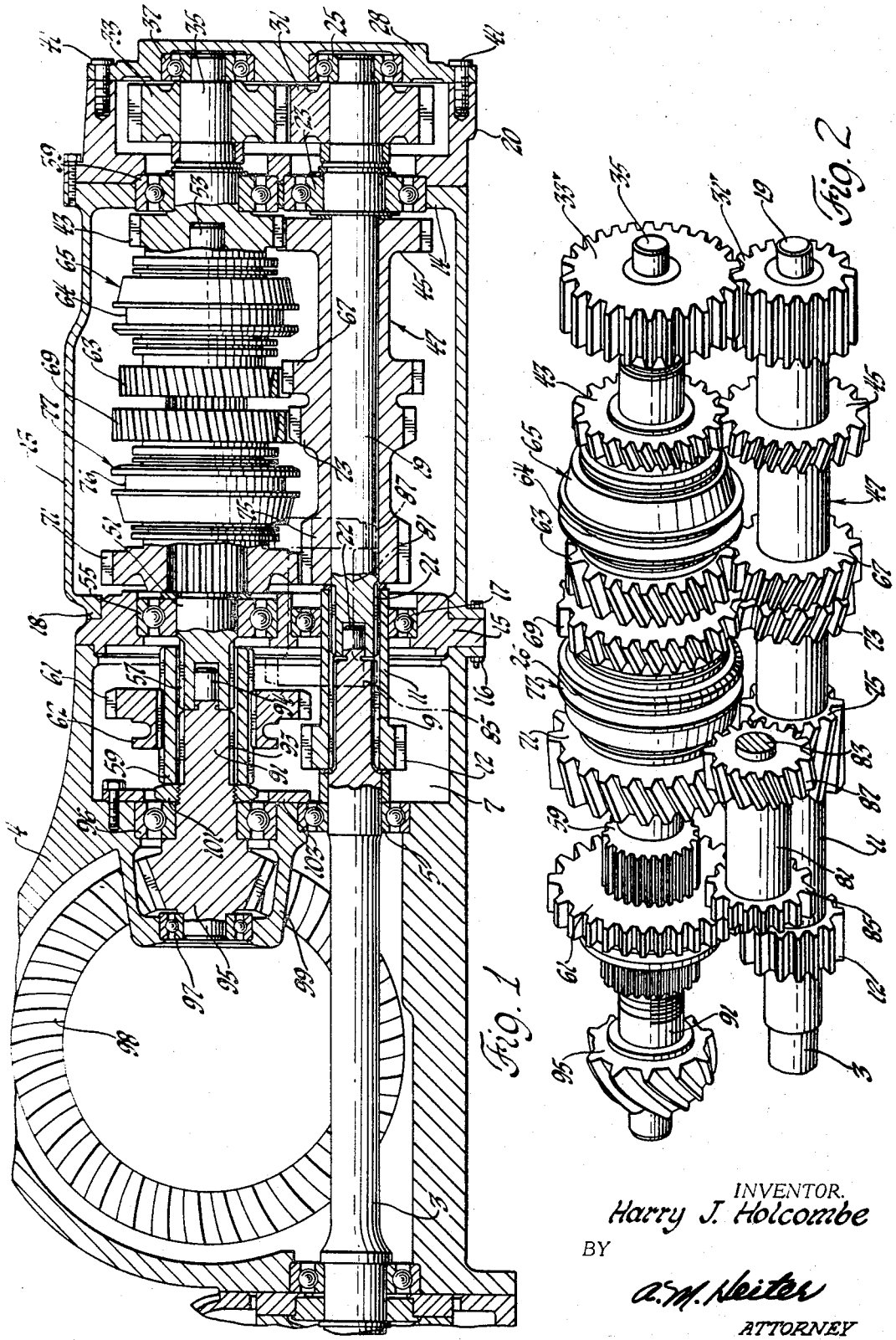
INVENTOR.
Harry J. Holcombe
BY
A.M. Neiter
ATTORNEY United States Patent Office 3,403,568
Patented Oct. 1, 1968

1

3,403,568
TRANSMISSION
Harry J. Holcombe, Royal Oak, Mich., assignor to General Motors Corporation, Detroit, Mich., a corporation of Delaware
Filed Aug. 16, 1965, Ser. No. 479,795
11 Claims. (Cl. 74—333)

ABSTRACT OF THE DISCLOSURE

A multispeed transmission having an input shaft which drives a quick change gear set located at one end of the transmission for routing input torque into a countershaft rotatably mounted on the input shaft. The countershaft has a cluster of gears which mesh with a plurality of gears rotatably mounted on a transmission output shaft providing constant mesh change-speed transmission ratios which are selected by operation of synchronizer assemblies mounted on the output shaft. The input shaft carries a low range pinion which may be engaged by a low-reverse sliding gear splined to the output shaft to provide a reduction ratio to permit power supplied to the input shaft to bypass the constant mesh gears. The low-reverse sliding gear is also slidable into engagement with a reverse idler which engages one of the cluster gears of the countershaft to provide a reverse drive. The transmission is mounted in a housing provided by three separate housing units which are connected together to facilitate access to the transmission gearing.

This invention relates to a new and improved change-speed power transmission and more particularly to a vehicle transmission providing an operator with a wide selection of gear ratios between the vehicle power plant and final drive permitting the vehicle to be efficiently operated under a variety of driving conditions and loads.

According to the present invention, there is provided a new and improved compact transmission including sliding gear mechanism selectively engageable with low range and reverse gear units for low range and reverse drive ratios. Furthermore, this transmission includes a plurality of constant mesh forward drive ratios suitably stepped to meet vehicle operational requirements. For sport car or other use, meshing quick-change gears are provided between transmission input and output shafts which may be replaced by other gears providing a different ratio to change overall transmission ratios without changing the steps between the constant mesh, forward drive ratios.

This transmission also features a new and improved case for supporting and housing the dynamic parts of the transmission. This case includes a portion of the differential housing for housing the low drive ratio, an attached housing for the constant mesh drive units and a connected end housing for the quick-change gears. The housings which make up the transmission case are suitably connected through new support plate structure which may be readily installed or removed. This structure provides excellent mountings for the power shafts and gears of the transmission. This transmission case including plate structure provides ready access to the various ratios and quick-change gears to facilitate disassembly and assembly.

An object of this invention is to provide a new and improved change speed transmission.

Another object of this invention is to provide a new and improved change-speed transmission featuring low range drive of the sliding gear type and a plurality of constant mesh forward drive ratios.

Another object of this invention is to provide a new and improved power transmission for meeting varying speed and torque demands, including a sliding gear unit for low range and reverse drives and a plurality of stepped constant mesh, forward drive ratios and a quick-change gear set for changing overall transmission ratios without change of the steps between the constant mesh forward drive ratios.

Another object of this invention is to provide a new and improved power transmission including a sliding gear mounted in a first housing unit, a plurality of forward drive ratios mounted in a second housing unit removably connected to said first housing unit and a quick-change gear unit mounted in a third housing unit removably connected to said second housing unit.

Another object of this invention is to provide a change-speed gear transmission which incorporates new and improved removable support plate structure mounting the transmission drive shafts to facilitate the assembly and disassembly of the drive shafts and gears supported thereon.

Another object of this invention is to provide a multispeed transmission having a plurality of ratios and structure providing for quick-change of overall transmission ratio without affecting transmission ratio steps.

Other objects and advantages will be apparent from the detailed description and drawings in which:

FIGURE 1 is a side sectional view of a preferred embodiment of the invention; and FIGURE 2 is a perspective view of the power train of the invention.

Turning now to FIGURE 1, there is provided an elongated rotatable input shaft 3 which is powered by a vehicle engine, not illustrated. This shaft extends through differential housing 4 preferably below the axis of the swing axles, not shown, and is rotatably mounted in the differential housing by ball bearing unit 5. The shaft 3 projects from this ball bearing unit into a chamber 7 formed by an end portion of the differential housing and terminates in an exteriorly-splined end portion 9. A cylindrical sleeve 11, internally splined to mate with the splines of end portion 9, extends from the end portion of shaft 3 into the interior of the centrally located housing 13. The sleeve 11 is formed with a low gear pinion 12 at one end and is rotatably mounted in support plate 15 by ball bearing unit 17. Plate 15 is an adapter plate shouldered to receive an end portion of the differential housing and an end portion 18 of housing 13. Spaced bolts 16 or other fasteners are employed to securely fasten the housings 4 and 13 and plate 15 together.

An elongated intermediate drive shaft 19, having an exteriorly-splined end portion 21 which meshes with the internal splines of sleeve 11, projects from sleeve 11 and extends completely through the housing 13 and through the end wall 14 thereof into an end housing 20. As shown in FIG. 1, shafts 3 and 19 are piloted at 22 and drive shaft 19 is rotatably mounted in the end wall 14 of the housing 13 and in cover member 28 spaced therefrom by ball bearing units 23 and 25. Secured by splines to the end of the intermediate shaft 19 and located within the end housing 20 is a spur gear 31 which may be of any suitable pitch diameter and which meshes with a second spur gear 33, also mounted within the end housing. These spur gears provide a change gear set for a purpose described below.

As shown, the second spur gear is splined and secured to drive shaft 35 which is rotatably supported by ball bearing unit 37 and 39 supported within the cover plate 28 and the end wall 14 of the housing. The spur gear set formed by the meshing spur gears provides means for changing the direction of power flow and may be utilized to provide different overall transmission ratios. This is done by substituting meshing spur gears 31′ and 33′ of unequal pitch diameters such as those shown in FIG. 2 for the spur gears of equal pitch diameter, of FIG. 1 by such procedure various transmission ratios can be provided to suit tire size or race course conditions. The cover plate 28 is secured to the end of the housing 20 by removable bolts or fasteners 41 so that it may be easily removed to provide ready access to the spur gear set permitting relatively quick change of the spur gears and ratios, if desired.

The upper spur gear drives the drive shaft 35 splined thereto. This drive shaft extends from the spur gear 33 back into the housing 13. Shaft 35 is mounted for rotation by ball bearing units 37 and 39 supported by cover plate 28 and the end wall 14. The drive shaft 35 is formed with a gear 43 at one end thereof which meshes with the gear 45 of a countershaft in the form of a four-speed cluster gear unit 47 rotatably mounted on shaft 19.

A rotatable and elongated output shaft 51 has one end journaled at 53 in the end of spur 43 and extends back through the housing 13, being mounted in plate 15 by ball bearing unit 55. The output shaft 51 terminates in an exteriorly-splined end portion 57 which extends into chamber 7. A sleeve 59 internally splined is mounted on the splined end portion of shaft 51. This latter-mentioned sleeve is also externally splined to slidably receive the mating internal splines of the low-reverse sliding gear 61. As illustrated, this gear has a grooved hub extension 62 for the reception of a conventional shifter fork, not shown, which when actuated by a shifter lever moves the gear 61 longitudinally on sleeve 59 for engagement of low or reverse drive gears or to a neutral condition.

As illustrated in FIG. 1, a shaft 91 has an external splined portion 93 which is received within the inner splined portion of the sleeve 59 and a projecting portion 94 piloted in the end of shaft 51. This shaft extends within the differential housing 4 and terminates in a final drive pinion 95 that meshes with the final drive ring gear 97. As shown, shaft 91 is supported by front ball bearing unit 97 in turn held by a support portion 99 projecting from the interior of the different housing and a rear ball bearing unit 96. A threaded nut 101 and retainer plate 103 fastened to housing 4 is utilized to secure the ball bearing unit 96 within the differential housing.

It will be seen that gear 43 mounted on shaft 35, in addition to gear 63 rotatably mounted on shaft 51, is controlled by operation of the shift sleeve 64 of synchronizer assembly 65 through a conventional shift lever and connected shift fork (not shown) for fourth and fifth range drives. The gear 43 meshes with spur gear 45 of the four-speed cluster gear to enable the cluster gear to drive meshing gears on shaft 51. Gear 67 and synchronizer controlled gear 63 provide the fourth gear ratio. The output shaft 51 also has gears 69 and 71 of different pitch diameters which mesh respectively with gears 73 and 75 of the cluster gear unit, controlled by the operation of synchronizer assembly 77 to provide third and second ratio, respectively.

As shown in FIG. 2, the reverse unit includes a reverse idler 81 which is rotatably mounted on a shaft 83 parallel to the output shaft 51 as well as input shaft 3, and intermediate shaft 19. The reverse idler includes gears 85 and 87. As shown, gear 87 constantly meshes with gear 75 while gear 85 is adapted to mesh with gear 61 on the sliding of the low-reverse gear to the right by operation of the low-reverse shifter lever and shifter forks, not shown.

In normal operation the clutch is disengaged by the operator disconnecting shaft 3 from the power plant and the transmission is conditioned for low range drive through the low and reverse shift lever, actuated to slide the gear 61 on splined sleeve 59 into meshing engagement with the low gear pinion 12. As soon as the clutch is engaged shaft 3 being connected to the vehicle power plant will be driven and thereby drive the low gear pinion 12. The low gear pinion will then drive the meshing low-reverse sliding gear 61 and the final drive pinion 95 will be driven. It will be noted that in low range operation the low range ratio transfers the torque, by-passing the rest of the ratios within the housing 13 and quick change gears within housing 20.

For second gear operation, the clutch is again disengaged and the shaft 3 is thereby disconnected from the vehicle power plant. The low-reverse sliding gear is then moved out of engagement with the low gear pinion 12 into a neutral position. The shift sleeve 76 of the synchronizer assembly 77 is moved by the operator through the second and third speed shift lever to the left so that gear 71 is secured to the output shaft 51. The clutch is then engaged by the vehicle operator and it will be seen that the power path is through the input shaft 3 and to intermediate shaft 19 by virtue of the connecting sleeve 11. From the intermediate shaft the power flow is through quick-change gears 31 and 33, gears 43 and 45 and then through gear 75 of the cluster gear unit, and meshing gear 71 providing second ratio to shaft 51. The differential pinion 95 is then driven by shaft 51 by virtue of the sleeve 59 which connects pinion shaft 91 to output shaft 51. The clutching operation for the other ratios is similar to that above and will not be further described.

For third gear operation, the shift sleeve 76 of the synchronizer assembly 77 is moved to the right in FIG. 1 again by operation of the second and third shift lever so that gear 69 is rigidly connected to shaft 51. Power flow is as in the second gear operation with the exception that the flow will be from gear 73 of the cluster gear unit to constantly meshing gear 69 cooperatively providing the third gear ratio and then through the output shaft 51 to the final drive pinion 95.

Fourth gear operation is similar to that of second and third gear operation except that the shifter sleeve 76 of the synchronizer assembly 77 is moved to a neutral condition while the shifter sleeve 64 of the synchronizer assembly 65 is moved to the left so that gear 63 is rigidly secured to the output shaft 51. Power flow will then be through the fourth gear ratio provided by the constantly meshing gears 67 and 63 instead of the second or third gear ratios mentioned above.

For fifth gear ratio, a direct drive, the shift sleeve 64 of the synchronizer assembly 65 is moved to the right to directly connect the gear 43 to the output shaft 51. Power will then be transmitted directly from shaft 35 to shaft 51 without involving the cluster gear unit 47. Since the fifth ratio is not through the cluster gear, it will be appreciated that the only reduction of speed and corresponding increase in torque, up to the final drive, is through the change gears 31' and 33' when utilized. By varying the pitch diameter of gears 33' and 31' the direct drive will be accordingly varied.

For reverse operation, best disclosed in FIG. 2, the low-reverse sliding gear 61 can be moved to the right in FIG. 2 so that gear 61 engages gear 85. It will be noted that gear 87 is in constant mesh with gear 75 and that when the low-reverse sliding gear is so shifted, the cluster gear 75 is able to drive the output pinion 95 in a reverse direction.

Even though applicant's construction, as shown and described, offers five forward speeds and reverse it is compact and readily accessible. Access may conveniently be had to the quick-change gears and constant mesh ratios by removing housings 20 and 13 and subsequently to the low-reverse sliding gear by removal of plate 15. Applicant by this invention has provided simplified sliding-mesh type gears for low speed operation enabling the multi-speed constant mesh ratios to be more closely stepped.

While a preferred embodiment of the invention has been shown and described, it will be appreciated that the invention is not to be limited to those details of construction shown and described but only by the claims which follow:

I claim:

1. In a multispeed transmission, a main shaft, said main shaft having a pinion mounted near one end thereof and a spur gear near the other end thereof, a second spur gear in engagement with said first spur gear, a second shaft extending from said second spur gear and having a drive gear secured thereto, a countershaft having a plurality of gears fixed thereon, one of said countershaft gears being in meshing engagement with said drive gear to permit said countershaft to be driven by said main shaft and said second spur gear, an output shaft piloted in said second shaft, said output shaft having a plurality of gears constantly meshing with the gears of said countershaft to provide a plurality of different speed ratios, said output shaft having a gear slidable into and out-of engagement with said pinion to provide a speed ratio lower than said first recited speed ratios when in engagement with said pinion permitting power supplied to said main shaft to by-pass said constant mesh gears of said transmission.

2. The transmission of claim 1 above in which said first and second spur gears form a change speed gear set for driving said countershaft.

3. In a multispeed transmission, a housing, a main shaft rotatably mounted in said housing, said main shaft having a pinion mounted near one end thereof and a spur gear near the other end thereof, a second spur gear in engagement with said first spur gear providing a change-speed gear set, a second shaft extending from said second spur gear and having a drive gear secured thereto, a cluster gear member having a plurality of gears driven by said second gear rotatably mounted on said main shaft, said drive gear meshing with one of said plurality of gears, an output shaft piloted in said second shaft, said output shaft having a plurality of gears constantly meshing with the gears of said cluster gears to provide a plurality of different ratios, said output shaft having a pinion slidable into and out-of engagement with said pinion to provide a low gear ratio when in engagement with said first-mentioned pinion to allow power supplied to said main shaft to by-pass said constant mesh gears of said transmission.

4. A multispeed transmission, a housing, a first drive shaft having a pinion gear and a spaced spur gear, a second drive shaft parallel to said first drive shaft having a second spur gear engaged with said first spur gear, a drive gear member spaced from said second spur gear, a countershaft having a plurality of gear members driven by said drive gear member, an output shaft piloted in said second shaft having a plurality of gears constantly meshing with the gears on said countershaft providing a plurality of selectively engageable gear ratios, a gear slidably mounted on the end of said output shaft, said last mentioned gear being engageable with said pinion gear to provide a speed ratio lower than said first recited ratios, and support plate means removably secured to said housing for supporting said drive shafts and said countershaft in said housing.

5. In a change-speed transmission, an input power shaft, a first gear mounted on said power shaft, an intermediate shaft driven by said power shaft, a spur gear mounted on the end of said intermediate shaft, a second spur gear of differing pitch diameter than said first spur gear meshing therewith, a drive shaft connected to said second spur gear and having a spaced drive gear thereon, a countershaft rotatably mounted on said intermediate shaft and having a gear meshing with said drive gear, an output shaft piloted in said drive shaft, said countershaft and said output shaft having a plurality of constantly meshing gears providing a plurality of transmission ratios, and a gear mounted for rotation with said output shaft and slidably mounted for movement into and out-of engagement with said first gear to provide a speed ratio, lower than said first recited ratios.

6. In a change-speed transmission, a rotatable input power shaft, a first gear secured for rotation with said power shaft, a rotatable intermediate shaft driven by said power shaft, a spur gear mounted on the end of said intermediate shaft, a second spur gear of differing pitch diameter than said first spur gear meshing therewith, a drive shaft connected to said second spur gear and having a spaced drive gear thereon, a countershaft rotatably mounted on said intermediate shaft and having a gear meshing with said drive gear, an output shaft journaled in said drive shaft, said output shaft having an end portion providing the output of said transmission, said countershaft and said output shaft having a plurality of constantly meshing gears providing a plurality of transmission ratios, a gear mounted for rotation with said end portion and slidably mounted into and out-of engagement with said first-mentioned gear to provide a speed ratio lower than said first recited ratios, said input power shaft and said end portion of said output shaft being oriented at one end of said transmission and said meshing spur gears being oriented at the opposite end of said transmission.

7. In a multispeed transmission, input and output members, first and second drivingly connected gear means mounted on said input and output members providing a low speed forward drive ratio, an intermediate shaft driven by said input member, an output shaft drivingly connected to said output member, a gear set operatively connected to said intermediate shaft, means for drivingly connecting said gear set to said output shaft, a cluster gear unit having a plurality of gears rotatably mounted on said intermediate shaft, gear means driven through one of the gears of said gear set and meshing with one of the gears of said cluster gear unit for driving said cluster gear unit, a plurality of spaced gears movably mounted with respect to said output shaft meshing with the gears of said cluster gear unit providing a plurality of stepped higher speed forward drive ratios, means for selectively connecting each of said gears on said output shaft rigidly thereto permitting said input member to drive said output member at selected speeds.

8. In a multispeed transmission, input and output members, first and second drivingly connected gear means mounted on said input and output members providing a first forward drive ratio, said first gear means being longitudinally slidable into and out-of meshing engagement with said second gear means, an intermediate shaft operatively connected to said input member, an output shaft drivingly connected to said output member, a torque transferring gear set operatively connected to said intermediate shaft, a cluster gear unit having a plurality of gears rotatably mounted on said intermediate shaft, third gear means operatively connected to one of the gears of said gear set and meshing with one of the gears of said cluster gear unit for driving said cluster gear unit, a plurality of spaced gears rotatably mounted with respect to said output shaft and meshing with the gears of said cluster gear unit for providing a plurality of other forward drive ratios, selectively engageable clutch means for selectively connecting each of said gears on said output shaft rigidly thereto permitting said input member to drive said output member at selected speeds, and additional selectively engageable clutch means for connecting said third gear means and said output shaft thereby enabling said input member to directly drive said output shaft.

9. In a multispeed transmission, transmission input and output means, first and second drivingly connected gears mounted respectively on said input and output means to provide a first forward drive ratio, one of said gears being slidable into and out of meshing engagement with the other of said gears, first housing means for said first and second gears, said transmission also including a plurality of forward drive constant mesh gears having fixed steps between the ratios thereof, power transmitting means for drivingly connecting said constant mesh gears to said input means, means for selectively connecting said constant mesh gears to said output means, second housing means for said constant mesh gears, means for removably securing said first and second housing means together, said means for drivingly connecting said constant mesh gears to said input means including quick change gear means for multiplying overall transmission ratio without changing the steps between the ratios of said constant mesh gears, a third housing means for said quick change gear means, means for removably securing said third housing means to said second housing means, and a reverse idler gear unit rotatably mounted in said transmission having one gear meshing with one of the gears of said constant mesh gears and a connected second gear adapted to be engaged by said sildable gear to condition said transmission for reverse drive.

10. In a multispeed transmission input and output shafts, first and second drivingly connected gears providing a first forward drive ratio, one of said gears being slidably mounted on said output shaft and movable into and out of meshing engagement with the other of said gears, said other of said gears being fixed to said input shaft, a first housing for said first and second gears, said transmission further including a plurality of constant mesh gears providing a plurality of different ratios having fixed steps therebetween, means for drivingly connecting said constant mesh gears to said input shaft, synchronizer means for selectively connecting said constant mesh gears to said output shaft, a second housing said constant mesh gears, support plate means for removably securing said housings together and supporting said shafts in said housings, said means for drivingly connecting said input shaft to said constant mesh gears including quick change gear means having meshing gears of equal pitch diameter for routing power from said input shaft to said constant mesh gears, a third housing for said quick change gear means, support plate means on said second housing for supporting said third housing and for supporting an end portion of said input shaft, a reverse gear idler unit rotatably mounted in said first and second housings, said reverse gear idler unit having a first gear meshing with one of said constant mesh gears and a connected second gear adapted to be engaged by said sliding gear to condition said transmission for reverse drive.

11. In a change speed transmission, input and output members, a gear set including a first gear operatively connected to said input and a second gear drivingly connected to said output, means slidably mounting said second gear on said output to permit said second gear to be moved into engagement with said first gear to provide a first forward drive ratio, a first housing for said gear set, a support plate secured to said first housing, an intermediate and an output shaft rotatably supported by said support plate, means for connecting said intermediate shaft to said input member, means for drivingly connecting said intermediate shaft to said output shaft, said last mentioned means including a multispeed gear unit having drive gears mounted on said intermediate shaft meshing with driven gears mounted on said output shaft, means for selectively connecting said driven gears to said output shaft, a second housing secured to said support plate, said gear unit being mounted in said second housing, said second housing having an end wall spaced from said support plate and supporting an end portion of said intermediate shaft, a third housing removably secured to said second housing, said third housing including a removable end plate, a first gear member secured to the end of said intermediate shaft, a second gear member meshing with said first gear member, said gear members being mounted in said third housing, a drive shaft secured to said second gear member and extending into said second housing from said third housing, means for drivingly connecting said second gear member to said forward drive gears, said output shaft being supported for rotation in said last mentioned means and extending through said support plate into said first housing, and means for drivingly connecting said output shaft to said output member.

References Cited

UNITED STATES PATENTS

| | | | |
|---|---|---|---|
| 1,654,924 | 1/1928 | Douglas | 74—333 |
| 1,859,788 | 5/1932 | Padgett et al. | 74—745 |
| 1,961,809 | 6/1934 | Wood | 74—745 |
| 2,034,778 | 3/1936 | Storey | 74—745 |
| 2,140,012 | 12/1938 | Hayes | 74—333 X |
| 2,504,904 | 4/1950 | Tarlton | 74—333 X |
| 2,520,194 | 8/1950 | Bennett et al. | 74—745 |
| 2,774,451 | 12/1956 | Stump | 74—333 X |
| 2,790,326 | 4/1957 | Blackstock | 74—333 X |
| 2,892,358 | 6/1959 | Backus et al. | 74—745 X |
| 3,088,336 | 5/1963 | Fodrea | 74—333 X |
| 2,661,634 | 12/1953 | Bechman et al. | 74—700 |
| 3,353,422 | 11/1967 | Dangauthier | 74—375 |
| 3,115,048 | 12/1963 | Cape | 74—333 |
| 3,148,556 | 9/1964 | Gibbs et al. | 74—325 |

FRED C. MATTERN, Jr., *Primary Examiner.*

THOMAS C. PERRY, *Assistant Examiner.*